United States Patent
Fleischer

[11] Patent Number: 6,164,420
[45] Date of Patent: Dec. 26, 2000

[54] MULTI-DIRECTIONAL LOCKING ARRANGEMENT FOR A VEHICLE

[75] Inventor: Horst Fleischer, Lauffen, Germany

[73] Assignee: DaimlerChrysler AG, Stuttgart, Germany

[21] Appl. No.: 09/293,054

[22] Filed: Apr. 16, 1999

[30] Foreign Application Priority Data

Apr. 16, 1998 [DE] Germany .......................... 198 16 801

[51] Int. Cl.[7] ...................................................... B62C 7/02
[52] U.S. Cl. ............................ 188/69; 188/82.77; 188/60
[58] Field of Search ............................... 188/60, 69, 82.7, 188/82.77, 74, 68, 161, 162, 71.6, 264 R, 264.1, 264 AA, 218 XL

[56] References Cited

U.S. PATENT DOCUMENTS 2,966,244  12/1960  Schreyer .
2,974,752  3/1961   Howard ...................................... 188/69
5,005,676  4/1991   Gassiat .............................. 188/264 AA
5,170,869  12/1992  Svab et al. .

FOREIGN PATENT DOCUMENTS 89 03 391    6/1989  Germany .
WO 93/09981  5/1993  WIPO .

*Primary Examiner*—Michael Mar
*Assistant Examiner*—Devon Kramer
*Attorney, Agent, or Firm*—Evenson, McKeown, Edwards & Lenahan, P.L.L.C.

[57] ABSTRACT

A locking arrangement for a vehicle in which a first locking element is non-rotatably connected with a vehicle wheel, and a triggerable second locking element is releasably engaged with the first locking element. The first locking element is a brake disk provided with recesses. The second locking element is a locking pawl which can be operated by a triggerable operating element against the restoring force of a restoring device and engages in the recess of the brake disk.

13 Claims, 8 Drawing Sheets

MULTI-DIRECTIONAL LOCKING ARRANGEMENT FOR A VEHICLE

BACKGROUND OF THE INVENTION

This application claims the priority of 198 16 801.2-21, filed Apr. 16, 1998, the disclosure of which is expressly incorporated by reference herein.

The present invention relates to a locking arrangement for a vehicle, having a first locking element, which is non-rotatably connected with a vehicle wheel, and a triggerable second locking element which can be brought into a releasable engagement with the first locking element.

Locking arrangements for vehicles are used for securing the vehicle in its parking position against an unintended rolling away. For example, WO 93/09981 describes an auxiliary emergency braking system for automobiles, in which a ratchet element is provided coaxially with respect to the drive shaft. A solenoid releasably engages a locking pawl in this ratchet element. Coaxially to the wheel axle, such an arrangement requires a relatively large amount of space which in many cases is not available, particularly with technically high-expenditure wheel suspensions.

U.S. Pat. No. 2,966,244 discloses a locking arrangement for automobiles, in which a disk is arranged on the drive shaft and has incisions in which a pawl element can be mechanically engaged.

U.S. Pat. No. 5,170,869 shows a parking position for an automatic transmission in which a pawl element also engages in a wheel provided with recesses. Such parking arrangements secure a vehicle against an unintended rolling away only if a connection exists between the drive shaft and the wheels, which occurs, for example, in the parking position in the case of automatic transmissions. Furthermore, such a locking arrangement can affect only the driven wheels. In contrast, a locking of the non-powered wheels is not possible.

DE 89 03 391 U1 describes a locking arrangement for a vehicle in which a ratchet wheel is non-rotatably connected with a vehicle wheel. A locking pawl is provided for a releasable engagement in the ratchet wheel. The locking pawl is operated by a solenoid connected with the locking pawl. When the locking pawl is engaged, the vehicle wheel can be rotated only counterclockwise, but when the locking pawl is disengaged, the vehicle wheel is freely rotatable. Thus, a securing against a rolling away, for example, on a hill, is achieved only in one direction, for example, in the case of an uphill parking position, but not in the case of a downhill parking position of the vehicle.

SUMMARY OF THE INVENTION

An object of the present invention is to provide a locking arrangement for a vehicle such that, while the construction is as compact as possible and the parts to be arranged on the vehicle wheel are as few as possible, this locking arrangement permits an optimal locking of the vehicle against a rolling away in any direction.

This object has been achieved according to the present invention by providing that the first locking element is a brake disk provided with recesses and the second locking element is a locking pawl which can be operated by a triggerable operating device against the restoring force of a restoring device and which engages in the brake disk recesses.

The fact that a brake disk provided with recesses is used as a first locking element into which the second locking element configured as a locking pawl engages permits, not only a compact construction of the locking arrangement but eliminates additional components for generating the locking effect, because of the use of the brake disk. Such a compact locking arrangement can furthermore be advantageously supplemented or added to existing vehicles.

The recesses are essentially constructed in an advantageous complementary manner to pawl elements of the locking pawl. This permits not only an easy engagement of the pawl in the recesses but also an optimal locking in the engaged condition of the locking pawl.

An advantageous embodiment provides that lateral boundary surfaces of the recess and pawl elements are at least partially chamfered such that the recesses and pawl elements have an area which tapers to the wheel axle. As the result of the chamfering of the pawl elements and of the recesses, a particularly optimal engaging and disengaging of the locking pawl is permitted in the recess of the brake disk.

In a particularly preferred embodiment, it is provided that the recesses are formed by spaces between connection webs of a ventilated brake disk, the connection webs laterally bounding the recesses. In this case, conventional ventilated brake disks can be used as first locking elements. Only the locking pawls and their operating devices, arranged, for example, on the brake anchor plates, must still be provided in this case.

Particularly with respect to a very compact construction, it is provided in an advantageous embodiment that the operating device comprises an eccentric drive which is fastened to a brake anchor plate, can be driven by a triggerable driving device and is prestressed by means of a spring device. As will be explained in detail in the following, such an eccentric drive requires only a very small space and is therefore also suitable for being used on technically very high-expenditure wheel suspensions where sufficient space is usually not available for the brake.

In principle, the driving device can be constructed in many different ways. In one currently contemplated advantageous embodiment, the driving device is an electric motor. In another advantageous embodiment, the driving device is a hydraulic cylinder.

The eccentric drive advantageously comprises an eccentric wheel which can be driven by the driving device by way of a worm drive. Rotational movement can be transmitted by way of a flat coil spring to a bush and from this bush to a pin disposed eccentrically with respect to the eccentric wheel. A movement of the pin in an oblong-hole-type recess provided in the locking pawl leads to an engaging and disengaging movement of the locking pawl rotatably disposed at a point of rotation.

BRIEF DESCRIPTION OF THE DRAWINGS

Other objects, advantages and novel features of the present invention will become apparent from the following detailed description of the invention when considered in conjunction with the accompanying drawings.

DETAILED DESCRIPTION OF THE DRAWINGS

Figure 1:
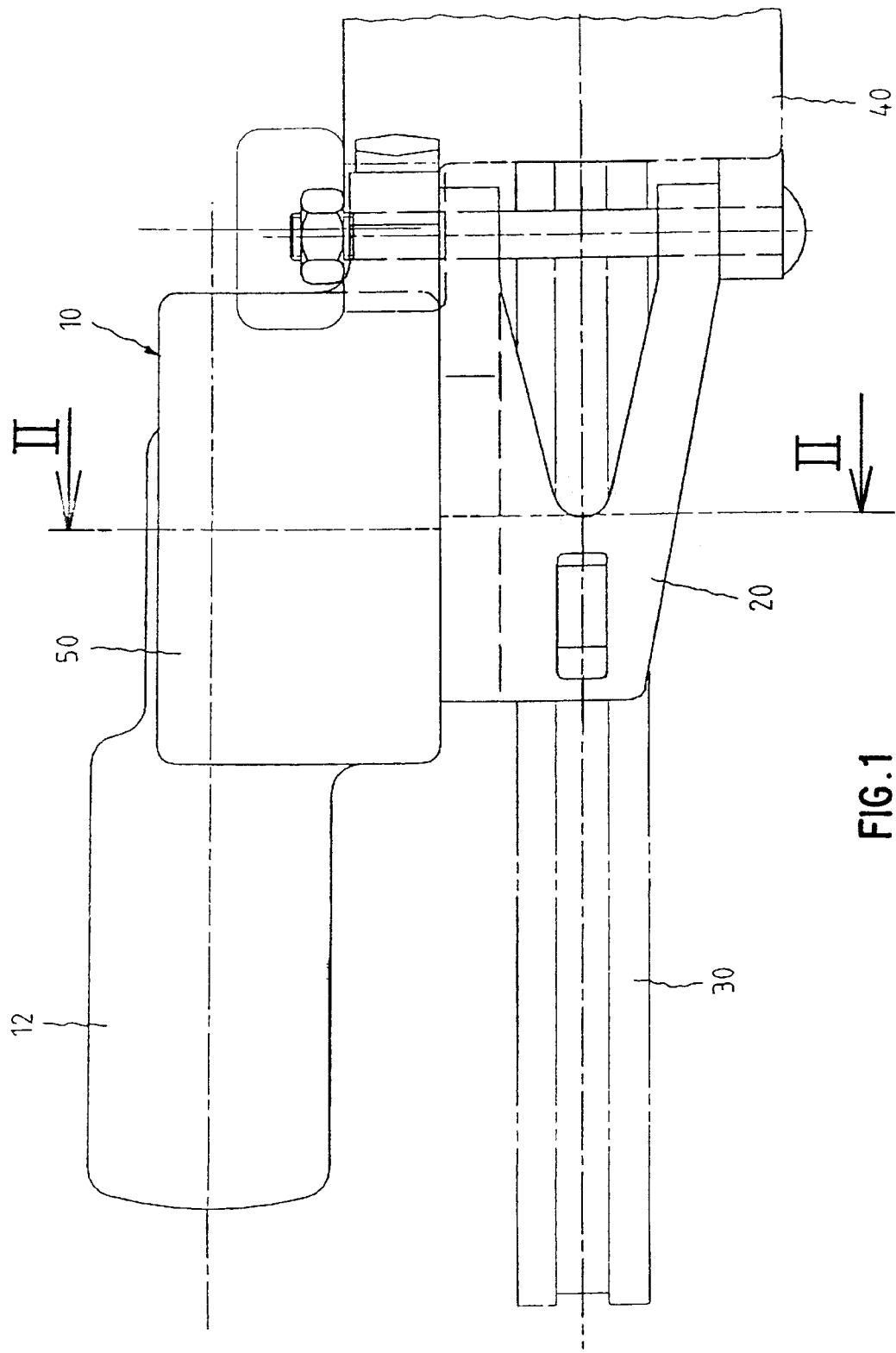
FIG. 1 is a top view of a locking arrangement for a vehicle utilizing the present invention.

An embodiment of a locking arrangement of a vehicle illustrated in FIGS. 1 to 5 includes a locking pawl 20 which can be operated by an operating device 10 and which engages in recesses of a brake disk 30 against a prestressing. Like the operating device 10, the locking pawl 20 is fastened, for example, on a brake anchor plate 40. The operating device 10 is in the form of a triggerable electric motor 12 and an eccentric drive 50 which will be described in detail in the following in conjunction with FIGS. 2 to 5.

Figure 2:
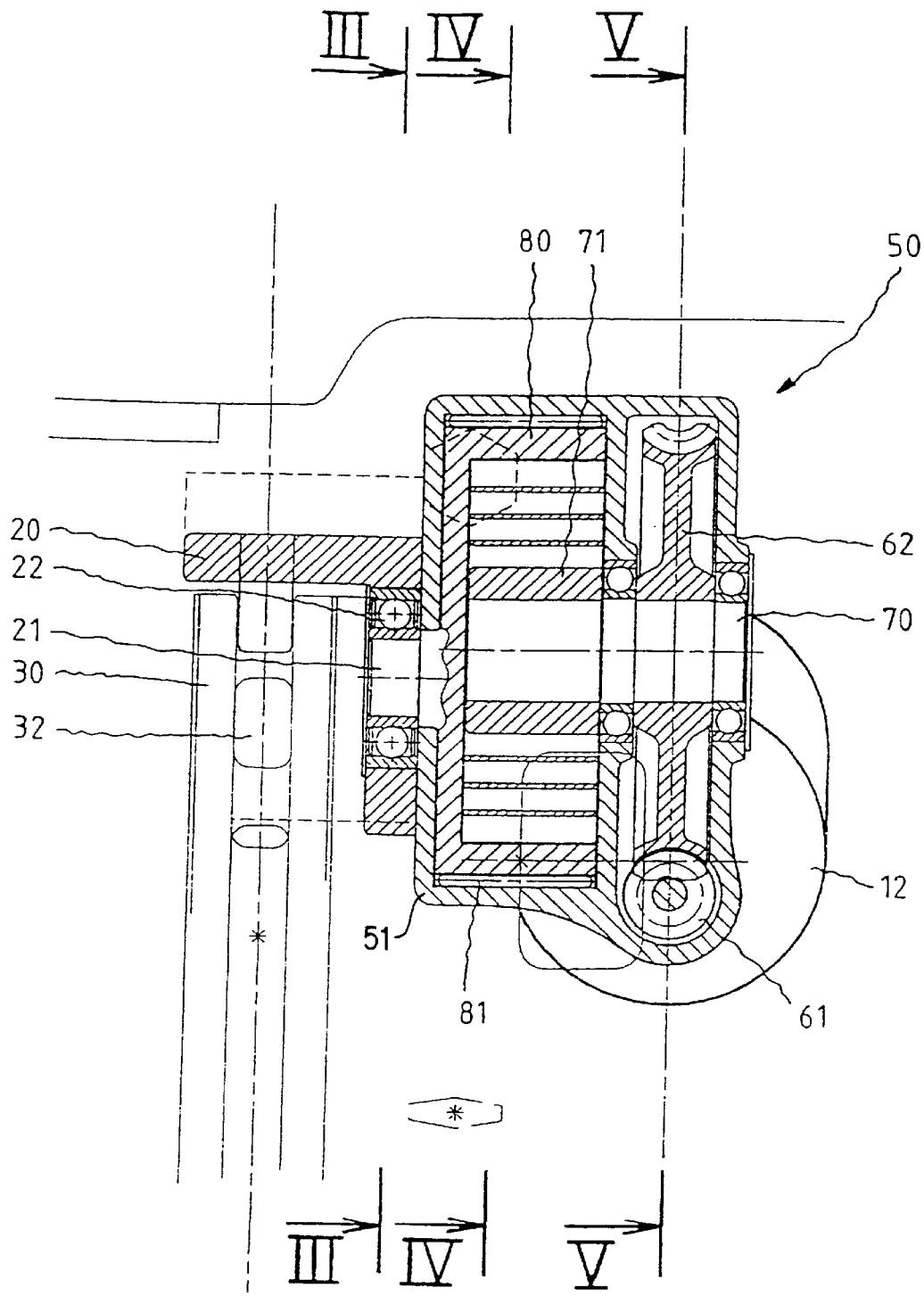
FIG. 2 is a sectional view of the locking arrangement along line II—II in FIG. 1.
Figure 3:
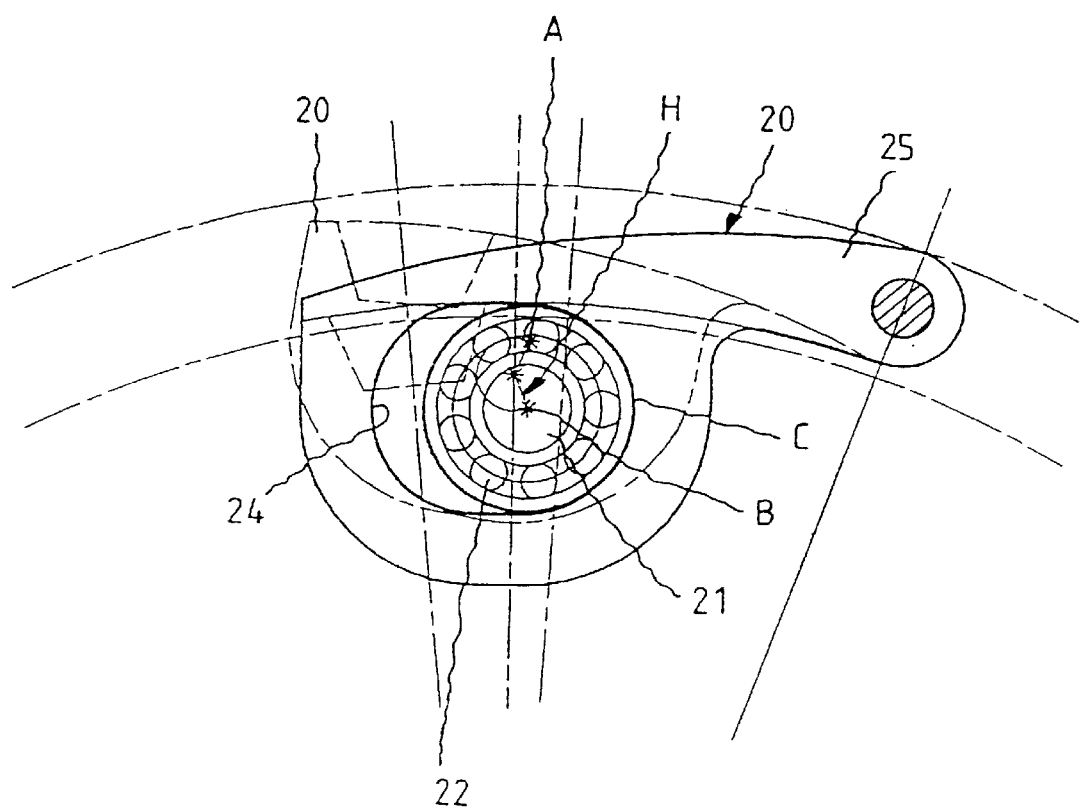
FIG. 3 is a sectional view of the locking arrangement along line III—III of FIG. 2.
Figure 4:
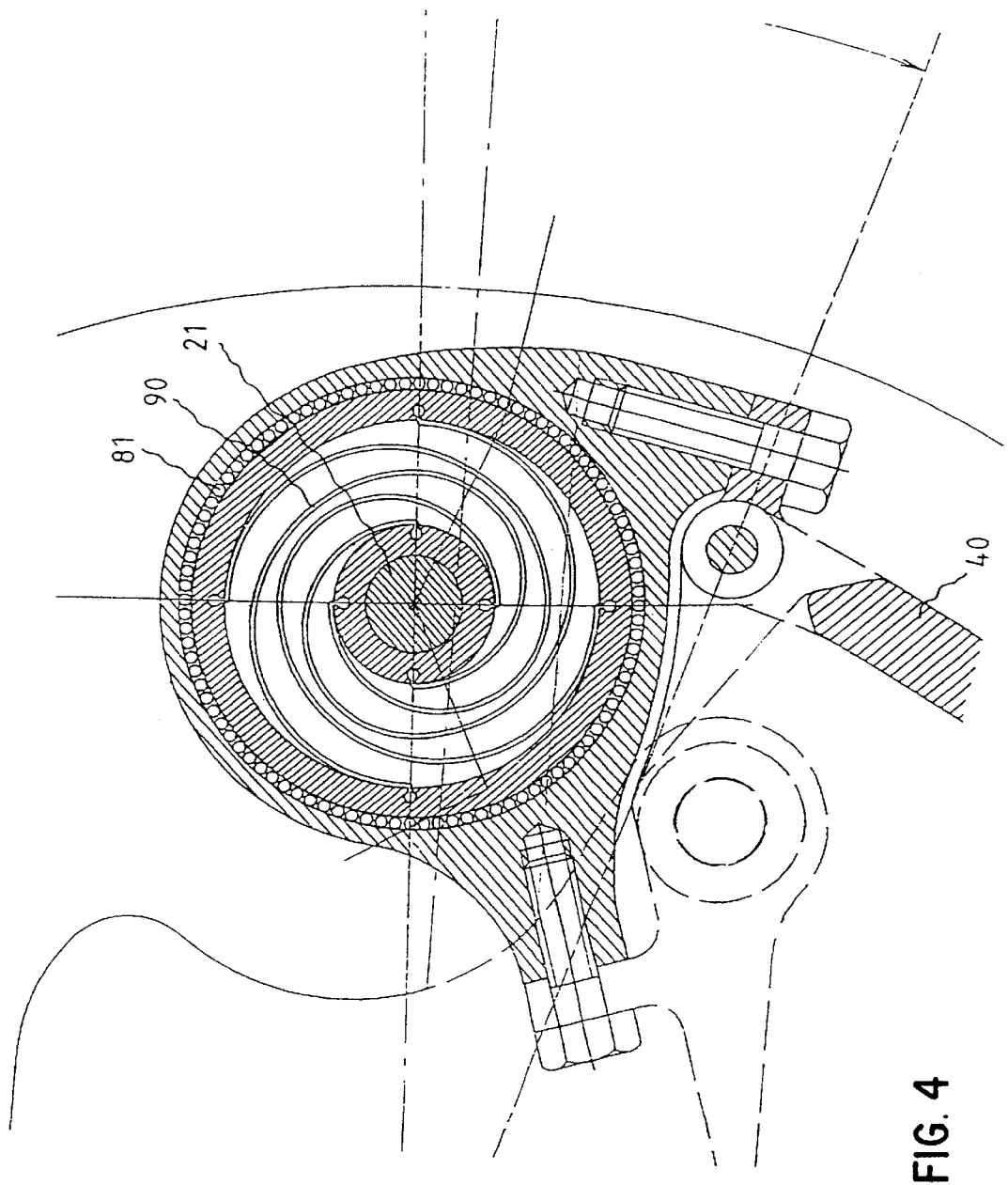
FIG. 4 is a sectional view of the locking arrangement along line IV—IV of FIG. 2.
Figure 5:
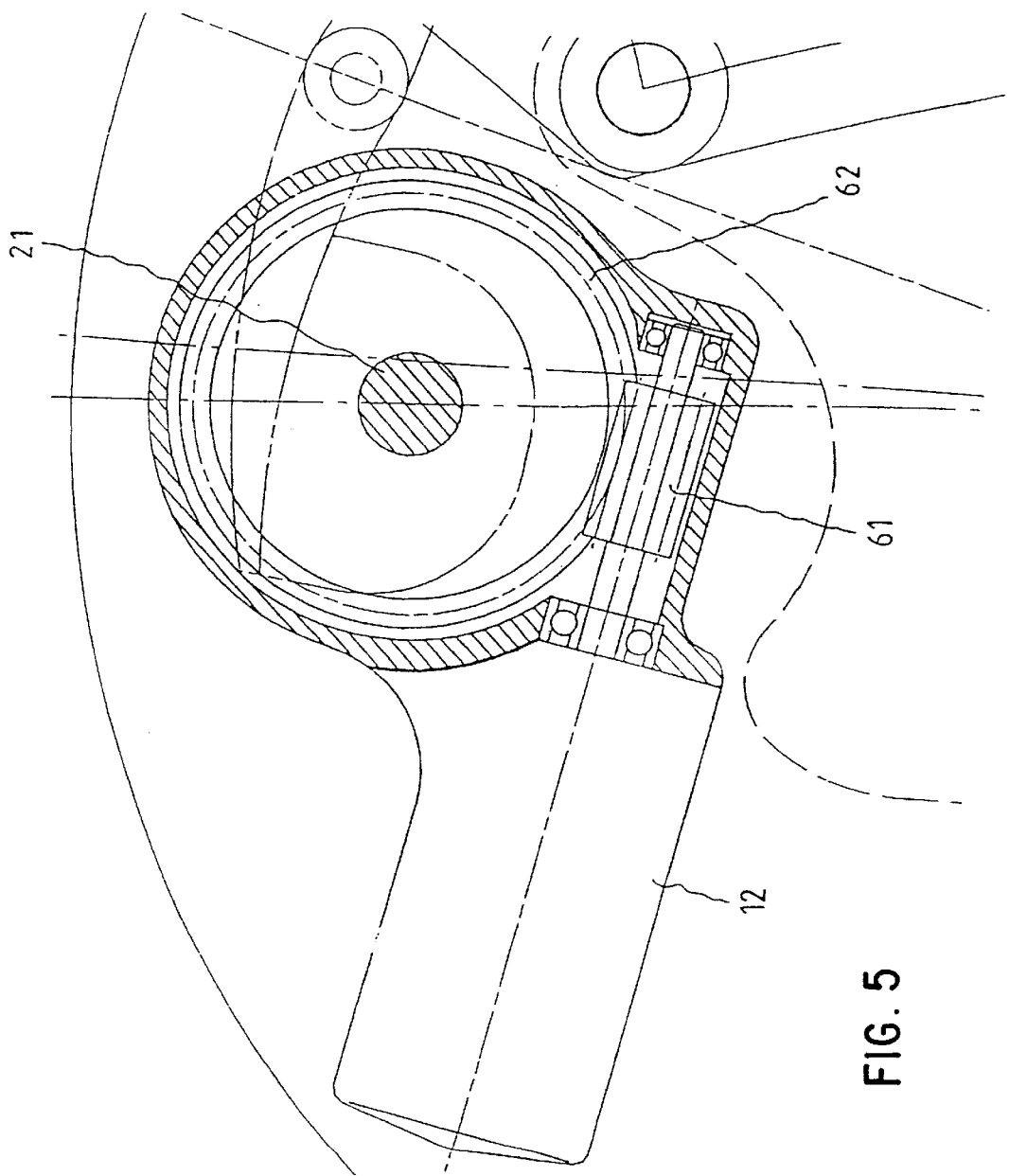
FIG. 5 is a sectional view of the locking arrangement along line V—V of FIG. 2.

As illustrated in FIGS. 2, 4 and 5, the eccentric drive 50 comprises a worm drive which is driven by the electric motor 12 and comprises a worm 61 which, by way of a driving element 62 engaging in the worm 61, causes a shaft 70 to rotate. A bush 71 is connected with the shaft 70 and transmits the rotating movement to an eccentric wheel 80 which is disposed in the housing 51 of the eccentric drive 50 by way of needle bearings 81. A spring 90 is provided between the bush 71 and the eccentric wheel 80 and has a spindle-like construction to permit a "soft" transmission of the torque from the worm 61 by way of the shaft 70 and the bush 71 to the eccentric wheel 80.

Figure 6:
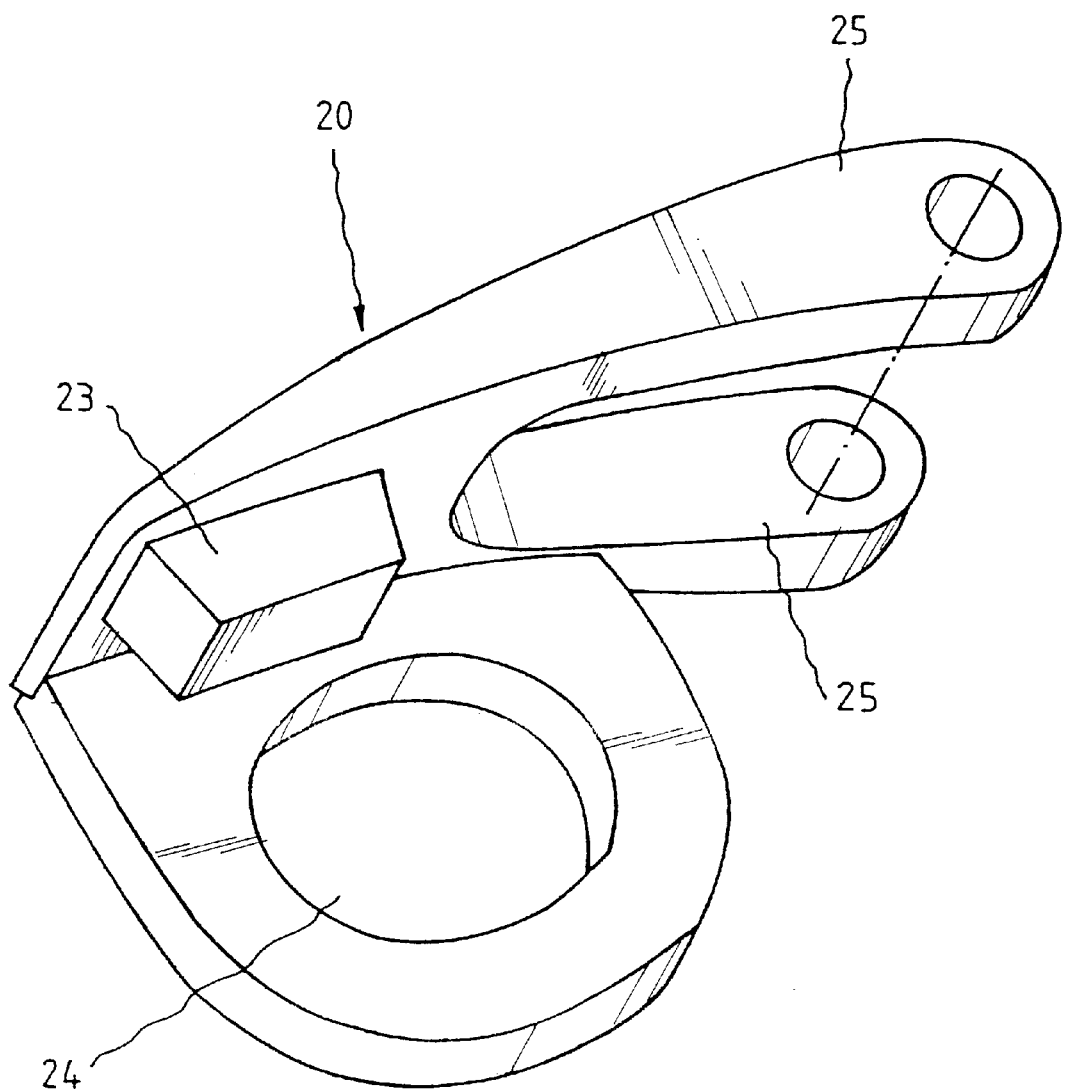
FIG. 6 is an isolated perspective view of a locking pawl used in the present invention.

An eccentric bearing pin 21, which is rigidly connected with the locking pawl 20 and can be driven by the eccentric wheel 80, is arranged eccentrically to the shaft 70. A needle bearing 22 is arranged concentrically to the eccentric pin 21 and is driven via the pin 21 by the eccentric wheel 80. The center of the bearing 22 and therefore the locking pawl 20 describe slightly more than a semicircle H, as illustrated schematically in FIG. 3 which shows, in addition to FIG. 6, the locking pawl 20 having a pawl element 23 as well as an oblong-hole-type recess 24, in which the eccentric pin 21 is displaceably guided by way of the bearing 22. The locking pawl 20 also comprises two fastening arms 25 which are rotatably fastened on a brake anchor plate 40.

An engagement and disengagement of the pawl element 23 in openings 32 of a brake disk 30 (see also FIG. 8) is caused by the movement of the eccentric bearing pin 21 and of the surrounding bearing 22 in the oblong-hole-type recess 14. The center of the bearing 22 carries out slightly more than a semicircular movement until the bearing 22 (on the right at the end of the oblong hole) strikes against a point C. Point A corresponds to the driving position, i.e., a disengaged condition of the locking pawl 20; and point B corresponds to a locking position, i.e., a maximally engaged position of the locking pawl 20.

Figure 8:
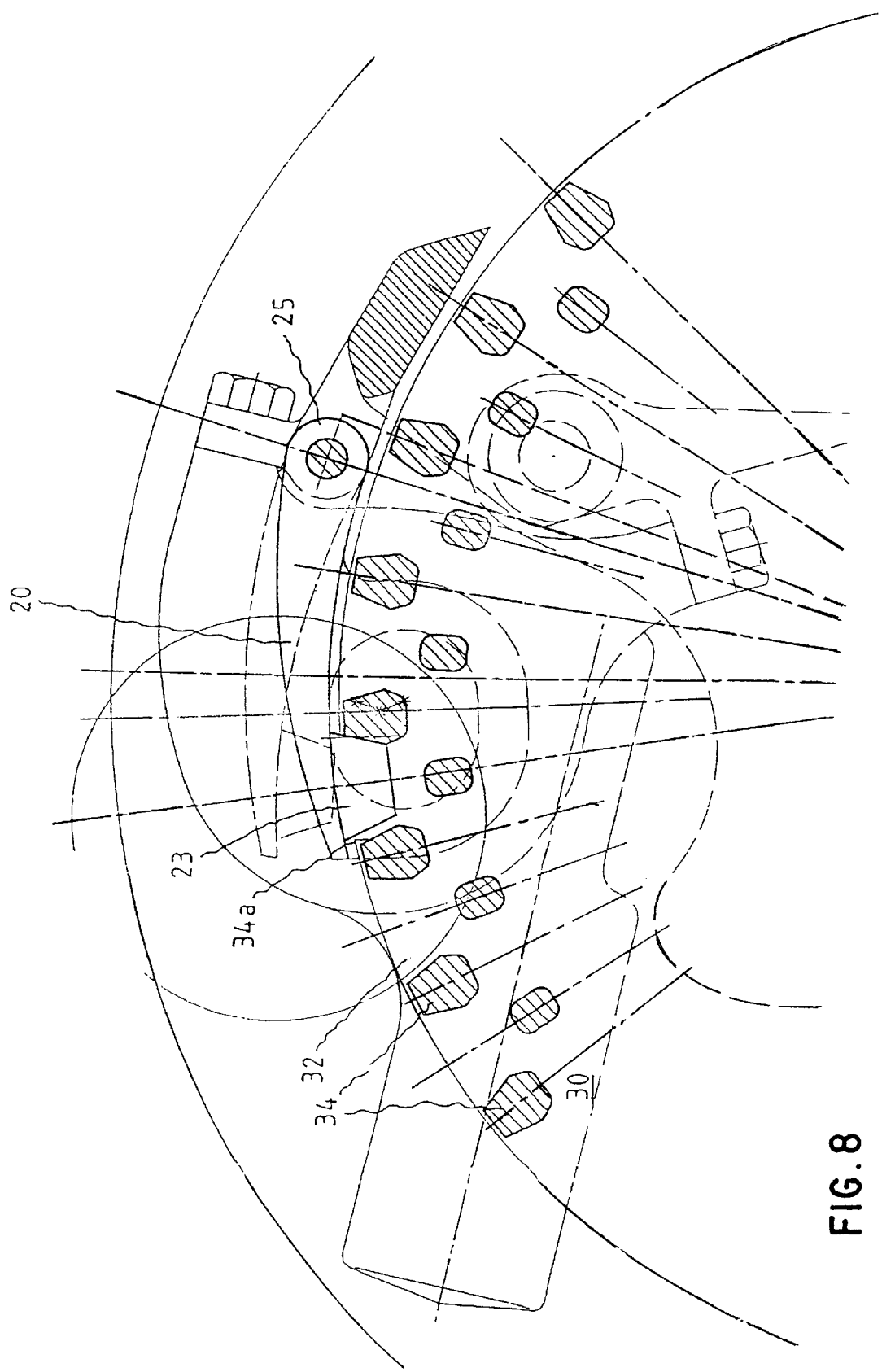
FIG. 8 is a partially sectional view of the interaction of the locking pawl with a brake disk of a vehicle.

As illustrated in FIG. 8, for example, a generally known type of ventilated brake disk 30 can be used as a locking element. The spaces between the connection webs 34 take over the function of the recesses 32. On their side facing the locking pawl 20, the connection webs 34 can have surfaces which are chamfered while tapering to the wheel axle. The pawl element 33, which also has surfaces 23a which are chamfered while tapering to the wheel axle, engages in these surfaces 34a. As the result of the chamfering of the lateral boundary surfaces of the recesses 32, i.e., by the chamfering of the connection webs 34 as well as of the pawl element 23, an optimal engagement and disengagement of the locking pawl is permitted. In the engaged condition, the locking arrangement secures the vehicle against a rolling away in the forward as well as in reverse direction.

Figure 7:
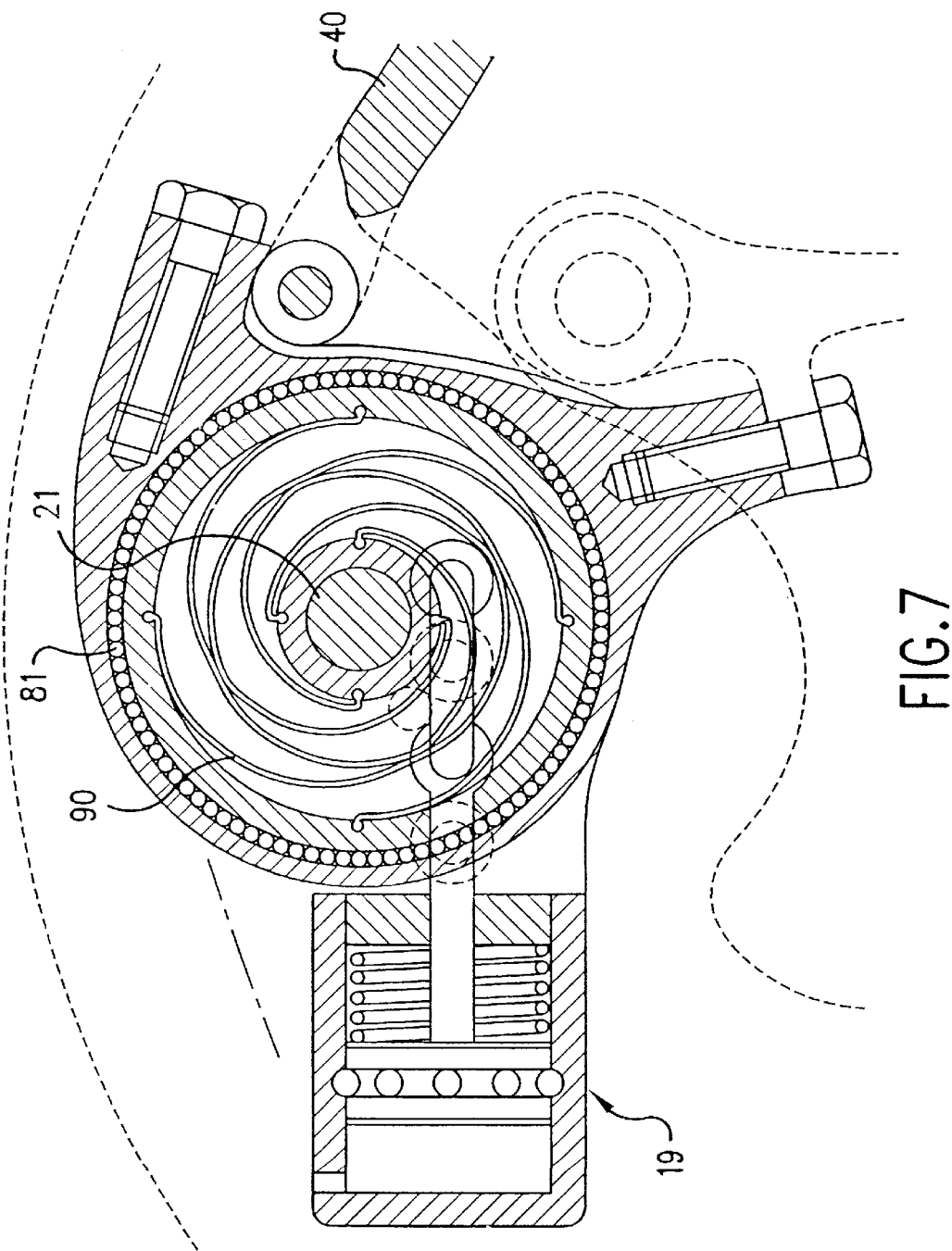
FIG. 7 is a sectional view of another embodiment of a vehicle locking arrangement utilizing the present invention.

Another embodiment of a locking arrangement illustrated in FIG. 7 differs from the embodiment illustrated in conjunction with FIGS. 1 to 6 only in that the eccentric drive 50 is implemented by a hydraulic cylinder 19 instead of by an electric motor 12. With respect to all other elements of the locking arrangement, however reference is made to the above description of the other parts.

In principle, the above-described locking arrangement can be provided on all wheels of the vehicle. Advantageously, this locking arrangement is arranged, in addition to a parking brake affecting the rear wheels in most cases anyhow, at the front wheels as an additional parking brake which can be operated electrically or hydraulically. In this way, a vehicle is secured against a rolling-away uniformly on all four wheels. In particular, this has been found very advantageous in heavy utility vehicles, because securing of only two wheels of such a vehicle is not often sufficient.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A locking arrangement for a vehicle, comprising a first locking element arranged to be non-rotatable connectable with a vehicle wheel, and a triggerable second locking element arranged to be brought into a releasable engagement with the first looking element, wherein the first locking element is a wheel brake disk having recesses, the second locking element is a locking pawl operable by a triggerable operating device against a restoring force and the locking pawl is arranged to engage in the recesses of the wheel brake disk.

2. The locking arrangement according to claim 1, wherein the recesses are configured in a substantially complementary manner to pawl elements of the locking pawl.

3. The locking arrangement according to claim 1, wherein lateral boundary surfaces of the-recesses and of pawl elements of the locking pawl are at least partially chamfered such that the recesses and the pawl elements have an area which tapers in a direction toward a wheel axle.

4. The locking arrangement according to claim 2, wherein lateral boundary surfaces of the recesses and of pawl elements of the locking pawl are at least partially chamfered such that the recesses and the pawl elements have an area which tapers in a direction toward a wheel axle.

5. The locking arrangement according to claim 1, wherein the operating device comprises an eccentric drive arranged to be fastened to at least one of a brake anchor plate and a steering knuckle, is drivable by a triggerable driving device and is prestressable by a spring device providing the restoring force.

6. The locking arrangement according to claim 5, wherein the recesses are configured in a substantially complementary manner to pawl elements of the locking pawl.

7. The locking arrangement according to claim 5, wherein lateral boundary surfaces of the recesses and of pawl elements of the locking pawl are at least partially chamfered such that the recesses and the pawl elements have an area which tapers in a direction toward a wheel axle.

8. The locking arrangement according to claim 5, wherein the recesses are formed by spaces between connection webs of a ventilated brake disk, and the connection webs laterally bound the recesses.

9. The locking arrangement according to claim 5, wherein the driving device is an electric motor.

10. The locking arrangement according to claim 5, wherein the driving device is a hydraulic cylinder.

11. The locking arrangement according to claim 5, wherein the eccentric drive comprises an eccentric wheel arranged to be driven by the driving device by way of a worm drive, a bush and a flat coil spring, with rotating movement of the eccentric wheel being transmitted to an eccentrically disposed eccentric pin such that a movement of the eccentric pin and a bearing, which surrounds the eccentric pin, in an oblong-hole-type recess provided in the locking pawl leads to engagement and disengagement movement of the locking pawl rotatably disposed at a rotation point.

12. The locking arrangement according to claim 11, wherein the recesses are configured in a substantially complementary manner to pawl elements of the locking pawl.

13. The locking arrangement according to claim 11, wherein lateral boundary surfaces of the recesses and of pawl elements of the locking pawl are at least partially chamfered such that the recesses and the pawl elements have an area which tapers in a direction toward a wheel axle.

\* \* \* \* \*